United States Patent
Seo et al.

(10) Patent No.: US 10,313,431 B2
(45) Date of Patent: Jun. 4, 2019

(54) STORAGE SYSTEM AND METHOD FOR CONNECTION-BASED LOAD BALANCING

(71) Applicant: SAMSUNG ELECTRONICS CO., LTD., Suwon-si, Gyeonggi-Do (KR)

(72) Inventors: Jung-Min Seo, Seongnam-si (KR); Ji-Hyung Park, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 243 days.

(21) Appl. No.: 15/361,450

(22) Filed: Nov. 27, 2016

(65) Prior Publication Data
US 2017/0171302 A1 Jun. 15, 2017

(30) Foreign Application Priority Data
Dec. 15, 2015 (KR) ........................ 10-2015-0179199

(51) Int. Cl.
*H04L 29/08* (2006.01)

(52) U.S. Cl.
CPC ...... *H04L 67/1002* (2013.01); *H04L 67/1097* (2013.01)

(58) Field of Classification Search
CPC ............. H04L 67/1002; H04L 67/1097; H04L 67/1008; H04L 67/101; H04L 67/1012; H04L 67/1021; H04L 49/109
USPC ....................................................... 709/226
See application file for complete search history.

(56) References Cited

U.S. PATENT DOCUMENTS

| | | | |
|---|---|---|---|
| 6,173,306 B1 | 1/2001 | Raz et al. | |
| 7,209,967 B2 | 4/2007 | Kitamura | |
| 7,519,725 B2 | 4/2009 | Alvarez et al. | |
| 7,924,720 B2 | 4/2011 | Wackerly | |
| 7,954,102 B2 | 5/2011 | Okawara | |
| 8,180,973 B1 | 5/2012 | Armangau et al. | |
| 8,819,307 B1 | 8/2014 | Raizen et al. | |
| 8,904,204 B2 | 12/2014 | Fletcher et al. | |
| 8,949,414 B2 | 2/2015 | Raja et al. | |
| 8,949,472 B2 | 2/2015 | Pinter et al. | |
| 9,043,194 B2 | 5/2015 | Nair et al. | |
| 9,559,900 B1* | 1/2017 | Morley | H04L 41/0806 |
| 9,600,337 B2* | 3/2017 | Karaje | G06F 9/5011 |
| 2012/0158886 A1* | 6/2012 | O'Connell | H04L 67/22 709/217 |
| 2012/0324159 A1 | 12/2012 | Bopardikar et al. | |
| 2013/0339322 A1* | 12/2013 | Amit | H03M 7/6023 707/693 |
| 2013/0339635 A1* | 12/2013 | Amit | G06F 9/5061 711/154 |
| 2016/0019150 A1* | 1/2016 | Otawa | G06F 12/0815 711/141 |
| 2016/0224394 A1* | 8/2016 | Farhan | H04L 67/1002 |

* cited by examiner

*Primary Examiner* — Ruolei Zong
(74) *Attorney, Agent, or Firm* — Volentine, Whitt & Francos, PLLC

(57) ABSTRACT

A load balancing method for a storage system includes receiving a log-in request from a client via a data network and a network adapter, using a control thread executed by one of a plurality of cores to assign a first connection between the client and a first data thread, and receiving I/O requests from the client and controlling the execution of one or more operations by a first core in response to the I/O requests. The plurality of cores includes a first core executing a first data thread and a second core executing a second data thread.

19 Claims, 14 Drawing Sheets

FIG. 6A

| Number of Clients | Core Utilization | IOPS |
|---|---|---|
| 1 | 76% (1% + 75%) | 98K |
| 2 | 247% (52% + 99% + 96%) | 175K |
| 3 | 340% (66% + 99% + 95% + 80%) | 230K |
| 4 | 429% (77% + 97% + 90% + 85% + 80%) | 281K |

FIG. 6B

| Number of Clients | Core Utilization | IOPS |
|---|---|---|
| 1 | 100% | 112K |
| 2 | 183% (100% + 83%) | 178K |
| 3 | 284% (100% + 84% + 100%) | 262K |
| 4 | 388% (100% + 88% + 100% + 100%) | 362K |

FIG. 13

BEFORE

| Threads | Limit IOPS | Connections | IOPS |
|---|---|---|---|
| DT_1 | 160K | C01 | 40K |
| | | C05 | 40K |
| | | C08 | 40K |
| | | C09 | 60K |
| DT_2 | 160K | C02 | 80K |
| | | C06 | 70K |
| DT_3 | 120K | C03 | 30K |
| | | C07 | 30K |
| | | C010 | 40K |
| DT_4 | 100K | C09 | 80K |

AFTER

| Connections | IOPS |
|---|---|
| C01 | 40K |
| C05 | 40K |
| C08 | 40K |
| C10 | 40K |
| C02 | 80K |
| C06 | 70K |
| C03 | 30K |
| C07 | 30K |
| C09 | 60K |
| C09 | 80K |

STORAGE SYSTEM AND METHOD FOR CONNECTION-BASED LOAD BALANCING

CROSS-REFERENCE TO RELATED APPLICATION

This application claims the benefit of Korean Patent Application No. 10-2015-0179199 filed on Dec. 15, 2015, the subject matter of which is hereby incorporated by reference.

BACKGROUND

The inventive concept relates to a storage system, and more particularly, to a storage system realizing connection-based load balancing and an operating method of the storage system.

A storage system may include a storage device for storing data and may provide a client access to the storage device via a network including (e.g.,) a personal computer (PC) or a computing server. In order to efficiently process access requests directed to a storage device from a plurality of clients, the storage system may include a data processor. That is, a data processor may be used to manage multiple requests communicated by one or more clients via the network, and to control storage device operations in response to the client requests. In this regard, the overall performance of the storage system may depend on the efficiency with which the client requests are managed.

SUMMARY

Embodiments of the inventive concept provide a storage system configured to efficiently manage input and/or output (hereafter, "I/O") requests from various clients via a network. Embodiments of the inventive concept provide a storage system capable of managing and performing I/O requests during the operation method of a storage system.

According to an aspect of the inventive concept, there is provided a load balancing method for a storage system. The storage system includes a plurality of cores including a first core executing a first data thread and a second core executing a second data thread, and a network adapter connecting a data network to the plurality of cores. The method includes; receiving a log-in request from a client via the data network and the network adapter, using a control thread executed by one of the plurality of cores, assigning a first connection between the client and the first data thread in response to the log-in request, and thereafter receiving input and/or output (I/O) requests from the client in the first core via the first connection and controlling the execution of one or more operations by the first core in response to the I/O requests.

According to an aspect of the inventive concept, there is provided another load balancing method for a storage system. The storage system includes a processor subsystem including a first core executing a first data thread and a second core executing a second data thread, and a network adapter connecting a data network to the processor subsystem and including a first work queue and a second work queue. The method includes; receiving a first log-in request from a first client, a second log-in request from a second client, and a third log-in request from a third client via the data network and the network adapter, using a control thread executed by processor subsystem to assign a first connection between the first client and the first data thread in response to the first log-in request, assign a second connection between the second client and the second data thread in response to the second log-in request, and assign a third connection between the third client and the first data thread in response to the third log-in request, wherein the assigning of the first connection and the assigning of the third connection by the control thread respectively comprise configuring the network adapter such that first input and/or output (I/O) requests received from the first client and third I/O requests received from third client are stored in the first work queue, and the first work queue is read by the first data thread.

According to an aspect of the inventive concept, there is provided a storage system connected via a data network to a plurality of clients. The storage system includes; a processor subsystem including a core executing a control thread, a first core executing a first data thread and a second core executing a second data thread, a network adapter that connects the data network to the processor subsystem, wherein upon receiving a log-in request from a client via the data network and the network adapter is configured by the control thread to assign a connection between the client and the first data thread, and thereafter upon receiving input and/or output (I/O) requests from the client, controlling the execution of one or more operations by the first core in response to the I/O requests.

BRIEF DESCRIPTION OF THE DRAWINGS

Embodiments of the inventive concept will be more clearly understood from the following detailed description taken in conjunction with the accompanying drawings in which:

FIGS. 6A and 6B are tables for describing experimental results with respect to load balancing methods in a storage system, according to exemplary embodiments;

FIG. 13 is a table for describing an operation of determining whether the connection may be migrated or not of FIG. 12, according to an exemplary embodiment.

DETAILED DESCRIPTION

Figure 1:
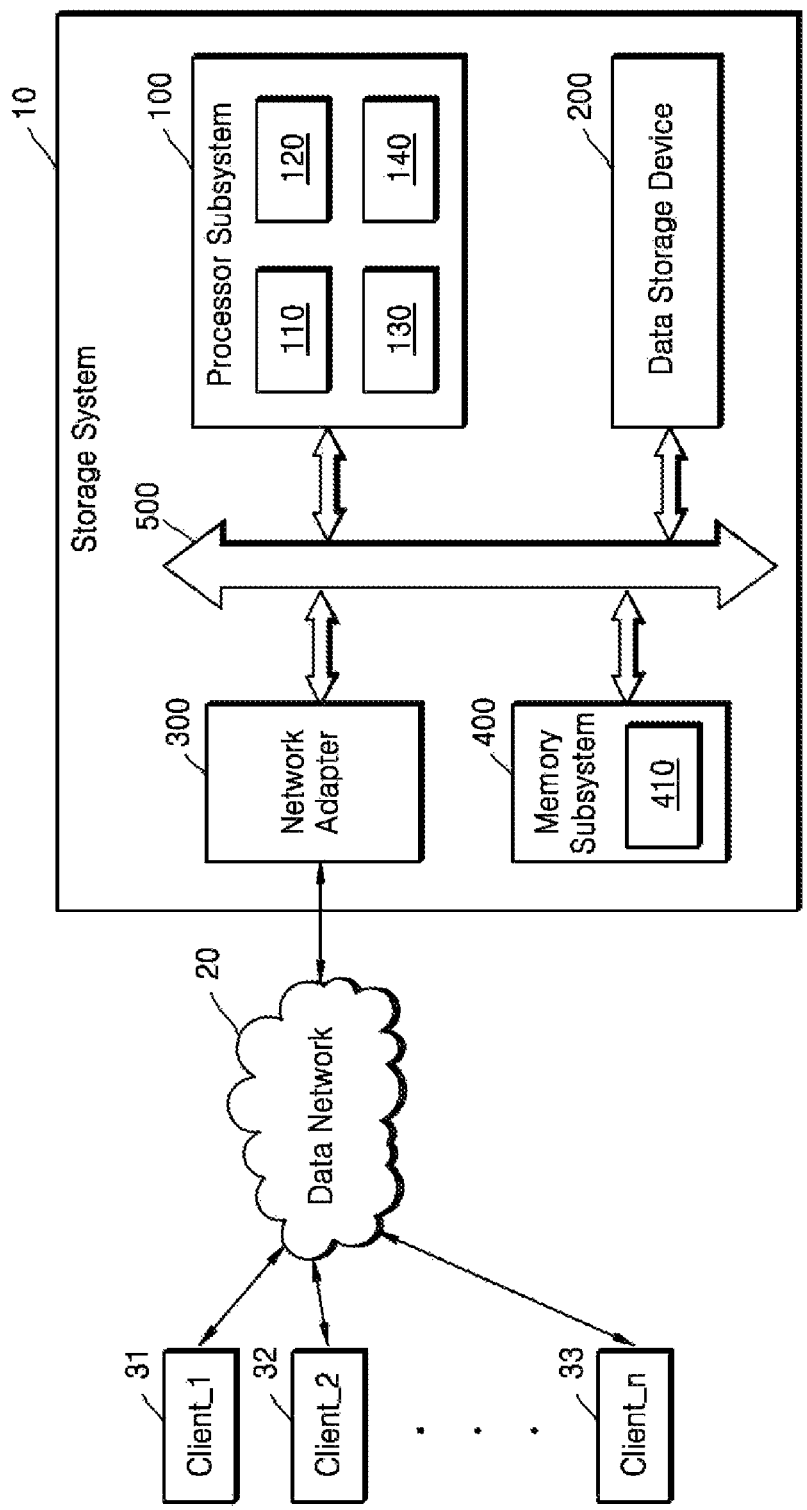
FIG. 1 is a block diagram of a storage system according to an exemplary embodiment.

Hereinafter, the inventive concept will now be described more fully with reference to the accompanying drawings, in which exemplary embodiments of the inventive concept are shown. Like reference numerals in the drawings denote like elements. The inventive concepts may, however, be embodied in different forms and should not be construed as being limited to only the illustrated embodiments set forth herein. Rather, these embodiments are provided so that this disclosure is thorough and complete and fully conveys the inventive concept to one of ordinary skill in the art. It should be understood that exemplary embodiments of the inventive concept are to cover all modifications, equivalents, and alternatives falling within the spirit and scope of the inventive concept. As used herein, the term "and/or" includes any and all combinations of one or more of the associated listed items. Expressions such as "at least one of," when preceding a list of elements, modify the entire list of elements and do not modify the individual elements of the list.

The terminology used herein is for describing particular embodiments and is not intended to be limiting of exemplary embodiments. As used herein, the singular forms "a," "an," and "the," are intended to include the plural forms as well, unless the context clearly displays otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood in the art to which the exemplary embodiments belong. It will be further understood that the terms such as those defined in commonly used dictionaries should be interpreted as having meanings consistent with their meanings in the context of the relevant art and will not be interpreted in an idealized or overly formal sense unless expressly so defined herein.

FIG. 1 is a block diagram illustrating a storage system 10 according to an exemplary embodiment. Here, the storage system 10 may be linked to a data network (or network) 20 connecting a plurality of clients 31 to 33 with the storage system 10. With this configuration, each one of the clients 31 to 33 may communicate with every other client via the data network 20.

The data network 20 may be variously configured and may include, by way of example, one or more of the following: an Ethernet, internet protocol (IP), remote direct memory access (RDMA) network, a router, a repeater, a gateway, a hub, etc. Information communicated via the data network 20 may be expressed according to one or more protocols, such as Fibre Channel, Fibre Channel over Ethernet (FCoE), internet small computer system interface (iSCSI), non-volatile memory express (NVMe) over Fabrics, etc.

Each of the clients 31 to 33 may be a stationary or mobile computing system, such as a desktop computer, a server, a workstation, a laptop computer, a tablet computer, a personal digital assistant (PDA), a mobile phone, a smart phone, etc. Each of the clients 31 to 33 may form a connection with the storage system 10 to communicate with the storage system 10. For example, each of the clients 31 to 33 may request that the storage device 10 forms a connection, where an established connection allows the client to communicate an input and/or output (hereafter, singularly or collectively, "I/O") request to the storage device 10, and/or receive a corresponding response from the storage device.

The storage system 10 may be used to share data among connected clients 31 to 33. Referring to FIG. 1, the storage system 10 may include a processor sub-system 100, a data storage device 200, a network adapter 300, and a memory sub-system 400, where such components (e.g., 100, 200, 300, and 400) of the storage system 10 may be interconnected by a system bus 500.

The processor sub-system 100 may be used to process requests received from the clients 31 to 33 via the network adapter 300. For example, the processor sub-system 100 may be used to manage log-in request(s) received from the clients 31 to 33. That is, the processor sub-system 100 may be used to negotiate log-in requests (or requests directed to storage system resources) among the clients 31 to 33 to determine I/O requirements and storage system responses to the clients 31 to 33. The processor sub-system 100 may also be used to control access to (e.g., the execution of various access operations) the data storage device 200 in response to various client I/O requests. In this regard, the processor sub-system 100 may determine a number of clients accessing the storage device 10, and/or the particular I/O requirement(s) for each connected client.

As illustrated in FIG. 1, the processor sub-system 100 may include a plurality of cores 110 to 140. Each core may be a processing unit, respectively capable of receiving and executing a stream of instructions. For example, each core may include circuitry capable of separately executing instructions defined according to a competent set of instructions, such as x86, Alpha, PowerPC, SPARC, etc. The cores 110 to 140 may access data and/or instructions stored in a cache memory, wherein in certain embodiments of the inventive concept the cache memory has a hierarchical structure. Although it is not illustrated in FIG. 1, one or more cache memories may be included in the processor sub-system 100.

Alternately or additionally, the processor sub-system 100 may include one or more multi-core processor(s). However, as illustrated in FIG. 1 an example of a processor sub-system 100 including four (4) cores 110 to 140 will be assumed hereafter, but those skilled in the art will understand that the scope of the inventive concept is not limited to only this configuration.

The data storage device 200 may be variously configured to receive, write (or program), read, and/or erase data, including client-generated data, instructions, metadata, error detection and/or correct (ECC) data, etc. Accordingly, the data storage device 200 may include a hard disk drive (HDD), a solid state drive (SSD), a semiconductor memory device, a memory card, a magnetic tape, an optical disk, etc. An operation of writing data to the data storage device 200 or reading data from the data storage device 200 may be controlled by the processor sub-system 100.

The network adapter 300 may serve as an interface between the data network 20 and the processor sub-system 100. For example, the network adapter 300 may include at least one network interface card connected to the system bus 500, where the network interface card may communicate (i.e., receive and/or transmit) data in a packet unit via the data network 200.

The memory sub-system 400 may be variously accessed by components 100, 200, and 300 of the storage system 10 via the system bus 500. For example, in order to store instructions forming (or generated by) a program being executed by the processor sub-system 100, or to store configuration information associated with the storage system 10, the memory sub-system 400 may include non-volatile memory devices, such as electrically erasable programmable read-only memory (EEPROM), flash memory, phase change random access memory (PRAM), resistance random access memory (RRAM), nano-floating gate memory (NFGM), polymer random access memory (PoRAM), magnetic random access memory (MRAM), ferroelectric random access memory (FRAM), etc. Also, in order to store data communicated among components 100, 200, and 300 of the storage system 10 or a cache memory of the processor sub-system 100, the memory sub-system 400 may include volatile memory devices, such as dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, Rambus DRAM (RDRAM), etc.

Referring to FIG. 1, the memory sub-system 400 may include a shared memory 410. For example, the shared memory 410 may be realized as RAM, such as DRAM, SRAM, etc., and may store data shared by components 100, 200, and 300 of the storage system 10. The shared memory 410 may also be used to store data and/or instructions used by one or more of the cores 110 to 140 of the processor sub-system 100.

Each of the cores 110 to 140 of the processor sub-system 100 may execute a set (or stream) of instructions respectively designated as a thread, where each thread may include a sequence of instructions separately managed by a scheduler (generally, provided by an operating system) for execution by a particular core. In this manner, a plurality of threads may be defined and executed in parallel, wholly or in part, within the processor sub-system 100. With this configuration, the processor sub-system 100 may process client requests received via the network adapter 300 according to a plurality of threads. Thus, instructions and/or operations may be executed according to (i.e., internal to) one or more threads, or outside of (i.e., external to) a one or more threads currently being executed by the processor sub-system 100.

As previously noted, a connection may be formed between a requesting client (i.e., any one of clients 31 to 33) and the storage device 10, whereupon a corresponding thread may be assigned to the connection. For example, a first connection formed between a first client 31 and the storage device 10 may be assigned to a first thread to be executed by the first core 110. Accordingly, the first thread may be used to process I/O requests received from the first client 31 via the first connection. That is, requests received from the first client 31 may be processed in relation to an assigned first thread executed by a correspondingly assigned first core 110. Alternately, the client I/O requests may be received from a client and variously processed across a number of threads being executed by multiple cores. However, as will be described hereafter with reference to FIGS. 6A and 6B, experimental results show that when specific client I/O requests are processed in relation to an assigned thread being executed by a correspondingly assigned core, an overall core utilization rate, as well as overall I/O request throughput are improved. Hereafter, a thread assigned to (or being executed by) a particular core—resulting in the execution of particular client I/O requests using the correspondingly assigned core—will be referred to as the data thread (or a data plane thread). Alternately, a thread assigned to one or more cores—resulting in the possible execution of particular client I/O requests across the one or more cores—will be referred to as a control thread (or a control plane thread). As will be described in some additional detail hereafter, a control thread maybe dynamically assigned (and reassigned) among a number of different connections to execute instructions associated with more than one client. In many instances, this approach tends to improve the utilization rate of the multiple cores 110 to 140 in the processor subsystem 100.

Figure 2:
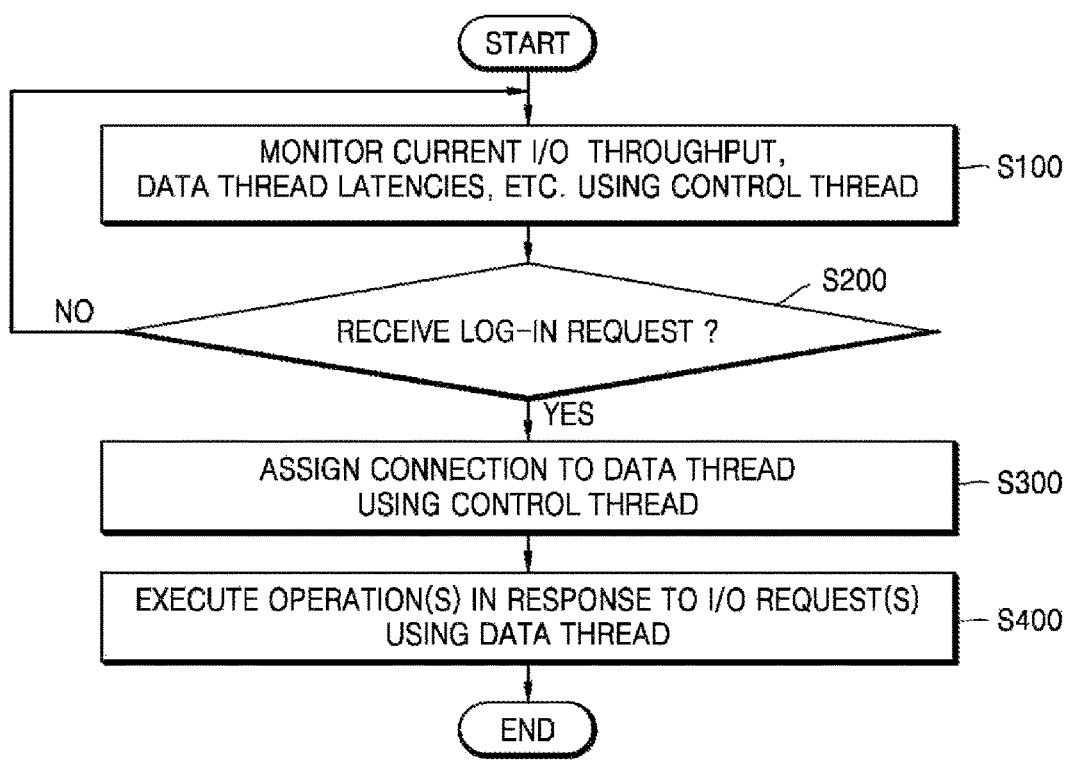
FIG. 2 is a flowchart of a load balancing method in the storage system of FIG. 1, according to an exemplary embodiment.

FIG. 2 is a flowchart summarizing a load balancing method that may be used in the operation of the storage system 10 of FIG. 1. Here, the method of FIG. 2 assigns (allocates) a client connection to a particular data thread when a client establishes communication with the storage system 10. The load balancing method of FIG. 2 may be controlled by the processor sub-system 100 (e.g., by one or more of the cores 110 to 140) used to variously execute one or more threads.

Referring to FIG. 2, the method monitors current I/O throughput (e.g., I/O operations executed per second (IOPS)) and/or data thread latencies (e.g., a time by which the execution of an I/O operation is delayed) using a control thread (S100). That is, using a designated control thread, current I/O throughput and data thread latencies may be monitored in real time. For example, an average I/O throughput or an average data thread latency may be monitored in relation to the I/O requirements for each assigned connection. In this regard, current I/O throughput or data thread latencies may be used to efficiently assign a new client connection to a data thread. Current I/O throughput or data thread latencies may also be used to migrate a client connection (and its resulting I/O requests) from an assigned data thread to another data thread. Current I/O throughout and/or data thread latencies may be periodically obtained according to an established schedule (e.g., a timer driven period) or may be obtained in response to a monitoring event (i.e., an event occurring in the storage system that indicates a probably need to update current storage system factor and/or condition information). Examples of monitoring events include a count of operation executed by data threads, a number of established connections per data thread, etc. Either or both of these approaches to the updating of current storage system factor and condition information (e.g., I/O throughput(s), data thread latencies, I/O throughput limits(s)) may be performed using a designated control thread.

The example method illustrated in FIG. 2 shows the step of receiving a client log-in request (S200) after the execution of the monitoring step (S100). However, as will be appreciated by those skilled in the art, these steps may be reversed in order of execution.

Regardless of the specific order of execution, the method makes a determination as to whether or not a client log-in request has been received (S200). For example, it is assumed that a first client 31 transmits a log-in request to the storage device 10 via the data network 20 in order to establish communication (i.e., establish a connection) with the storage device 10. Thus, the log-in request by the first client 31 is received in the storage system 10 via the network adapter 300 and thereafter processed by a designated control thread running on the processor subsystem 100.

That is, once a client log-in request is received, the storage system 10 will assign a connection corresponding to the requesting client and designate a thread to process I/O requests and associated operations received via the assigned connection with the client. Here, the initially designated control thread used to assign the client connection may choose an appropriate type of thread to handle the newly assigned client connection (e.g., a data thread verses a control thread). Accordingly, the initially designated control thread may assign the new client connection to (1) a data thread provided by the processor subsystem 100 or (2) a control thread provided by the processor subsystem (S300). In this regard, the initially designated control thread may assign itself or some other control thread as the thread to handle I/O requests from the new client connection.

Extending the working assumption above, the initially designated control thread being executed by the processor subsystem 100 may assign a first data thread to the first connection associated with the first client 31 in response to at least one of; current I/O throughput(s), data/control thread latencies, data/control thread limitations, and I/O requirement(s) associated with the first client 31 and/or its corresponding first connection. Alternately, the initially designated control thread may assign a first control thread to the first connection associated with the first client 31 in response to at least one of; current I/O throughput(s), data/control thread latencies, data/control thread limitations, and I/O requirement(s) associated with the first client 31 and/or its corresponding first connection.

The step of assigning a client connection to a data thread or a control thread (S300) will be described in some additional detail with reference to FIG. 7.

Once the client connection has been assigned to a data thread or a control thread (S300), the illustrated method of FIG. 2 may control the execution of various operation(s) in response to client I/O requests received via the assigned connection (S400). Thus, once the first client 31 connection has been assigned by the initially designated control thread to either a data thread or a control thread for processing, I/O request(s) sequentially received from the first client 31 via the first connection may result in the execution of one or more operations responsive to the I/O request(s).

Figure 3:
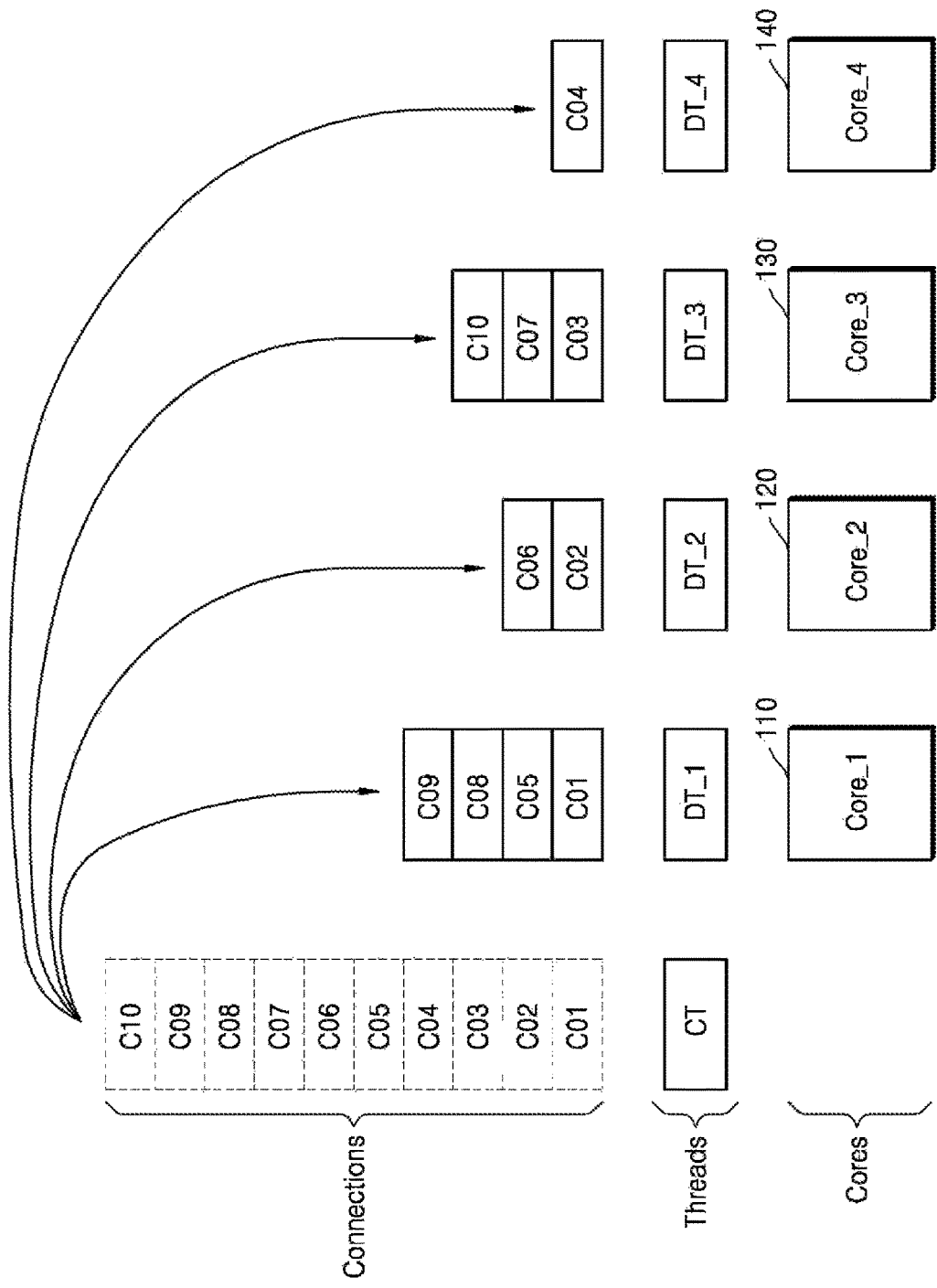
FIG. 3 is a diagram of an operation of allocating connections according to an exemplary embodiment.

FIG. 3 is a conceptual diagram further illustrating one possible approach to the operation of the storage system 10 according to embodiments of the inventive concept. In particular, FIG. 3 illustrates an approach that may be used in the assignments of client connections to the storage system 10. In the example of FIG. 3, it is assumed that a single control thread (CT) is used to assign incoming client connection requests (any one of connections C01 to C010) to one of four possible data threads (DT_1 to DT_4) for execution. Other embodiments of the inventive concept may include multiple control thread, wherein one of the multiple control threads at any given point in time may act as the initially designated control thread that assigns client connection(s) to either a data thread or a control thread.

Referring to FIGS. 1, 2 and 3, it is further assumed that each one of the four cores 110 to 140 of the processor subsystem 100 provides the computational capabilities to provide (hereafter, "executes") a corresponding data thread (DT_1 to DT_4, respectively). Here, one or more of the four cores 110 to 140 may be used to execute the single control thread CT, for example during idle period(s) of the data threads DT_1 to DT_4. One or more connections may be assigned to each of the data threads DT_1 to DT_4, and I/O requests corresponding to each connection may be processed by the correspondingly assigned data thread.

The illustrated example of FIG. 3 arbitrarily assumes ten (10) connections C01 to C10 assigned among the four (4) data threads DT_1 to DT_4 by operation of the control thread CT, where a first connection C01, fifth connection C05, eighth connection C08, and ninth connection C09 are assigned to the first data thread DT_1 executed by the first core 110; a second connection C02 and a sixth connection C06 are assigned to the second data thread DT_2 executed by the second core 120; a third connection C03, seventh connection C07, and tenth connection C10 are assigned to the third data thread DT_3 executed by the third core 130; and a fourth connection C04 is assigned to the fourth data thread DT_4 executed by the fourth core 140.

Figure 4:
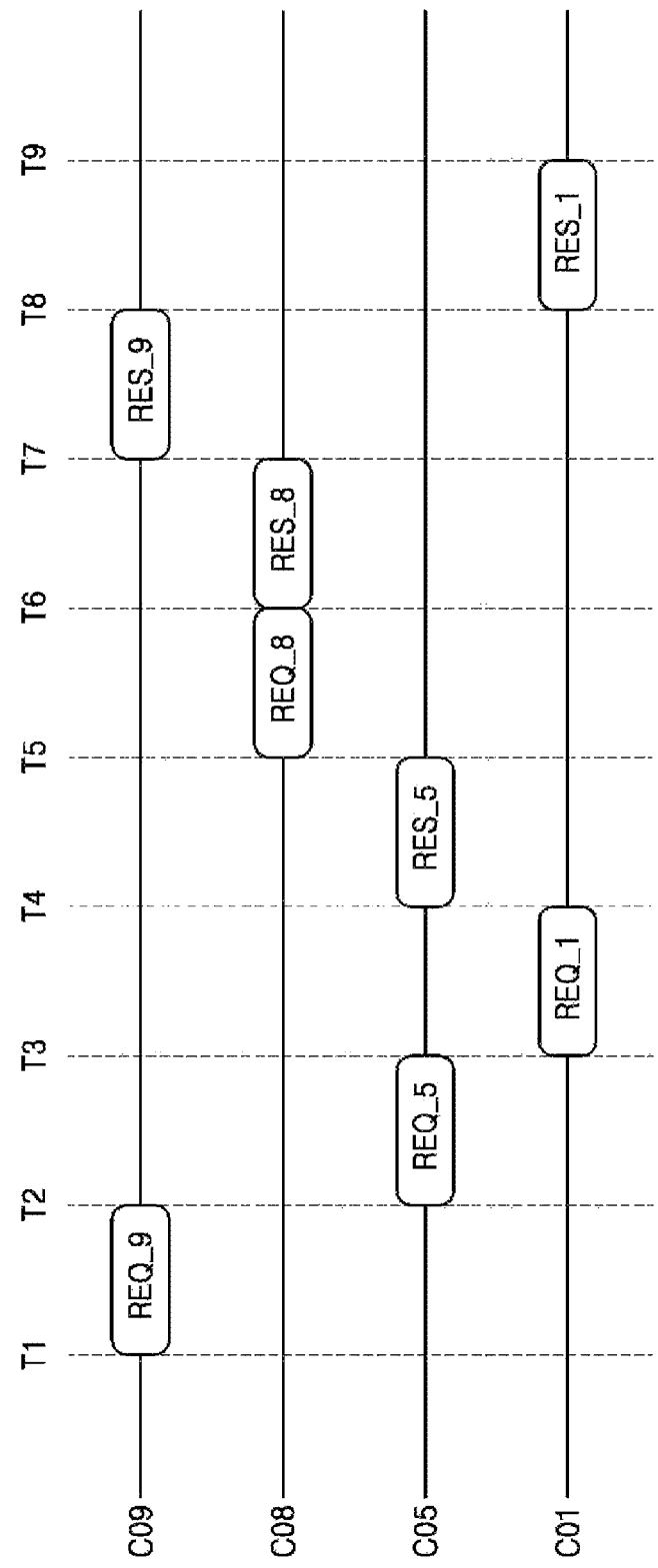
FIG. 4 is a diagram for describing an operation in which input or output requests corresponding to a plurality of connections are processed by one data thread, according to an exemplary embodiment.

FIG. 4 is a timing diagram further illustrating the operation of the storage system 10 of FIGS. 1 and 3. In FIG. 4, the first data thread DT_1 is shown processing a sequence of I/O requests (REQ) variously received via the first connection C01, fifth connection C05, eighth connection C08 and ninth connection C09, as well as corresponding responses (RES) to the I/O requests. That is, I/O requests communicated from the four connections C01, C05, C08, and C09 are processed using the first data thread DT_1 executed by the first core 110 of FIGS. 1 and 3. More particularly, requests REQ_1, REQ_5, REQ_8, and REQ_9 are assumed to be either input write requests (i.e., requests to execute a respective write operation) or output read requests (i.e., requests to execute a respective read request) directed to one or more address(es) in the data storage device 200. Accordingly, the respective responses RES_1, RES_5, RES_8, and RES_9 may be write operation completion indications by the storage system 10 or read data returns from the data storage system 10.

In FIG. 4, it is assumed that the first data thread DT_1 is capable of scheduling the execution of the operation(s) corresponding to 110 requests, as received from the assigned client connections. Once appropriately scheduled, the corresponding operations will be executed (or processed) in scheduled order, and resulting response(s) generated accordingly. In FIG. 4, the first data thread DT_1 may control the processing of I/O requests received from the four connections C01, C05, C08, and C09 according to a schedule defined by a fair (or unweighted) scheduling schema (e.g., a round robin scheduling scheme). Alternately, the processing of I/O request by the first data thread DT_1 may be scheduled using a priority (or weighted) scheduling schema. Variable weighting between different client connections, and/or I/O request types (e.g., write requests or erase request verses read requests), etc. may be used to determine an order of execution among multiple I/O requests received from multiple connections by a data thread.

Thus, in the illustrated example of FIG. 4, an I/O request (REQ_9) received at time T1 from connection nine C09 does not receive a corresponding response (RES_9) until time T7, while an I/O request (REQ_5) later received at time T2 from connection five C05 receives a corresponding response (RES_5) at time T4, and an I/O request (REQ_8) received at time T5 from connection eight C08 receives an immediate corresponding response (RES_8) at time T6.

Figure 5:
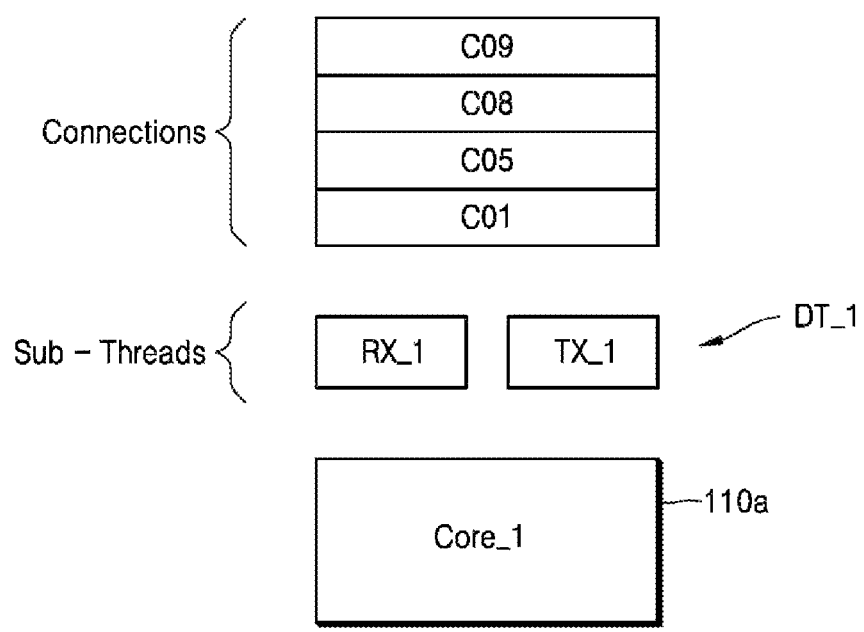
FIG. 5 is a diagram of a thread executed in a core, according to an exemplary embodiment.

FIG. 5 is another conceptual diagram illustrating one approach to the execution of different receive (RX1)/transmit (TX1) sub-threads in a data thread by a corresponding core. The illustrated example of FIG. 5 extends aspects of the working example described in FIGS. 1, 3 and 4. However, here it is assumed that a first data thread DT_1, including two (2) sub-threads RX_1 and TX_1, is executed by an assigned first core 110a, where consistent with FIGS.

3 and 4 connections C01, C05, C08, and C09 are assigned to the first data thread DT_1, including two sub-threads RX_1 and TX_1.

According to the embodiment illustrated in FIG. 5, an I/O request received from any one of the assigned client connections (C01, C05, C08 and C09) may be scheduled and processed by one of the two sub-threads being collectively executed on the assigned core 110a. Here, it is assumed for purposes of illustration, that incoming I/O requests from each of the connections assigned to the first data thread DT_1 is classified by type (e.g., either transmit type or receive type) and further assigned to one of the sub-threads (RX_1 and TX_1). For example, input requests received from connections C01, C05, C08, and C09 may be scheduled and processed by the receiving sub-thread RX_1, while output requests from connections C01, C05, C08, and C09 may be scheduled and processed by the transmitting thread TX_1. Of course, this is just one example of many different classifications or further assignments of received I/O requests that may be made in relation to two or more sub-threads being executed as respective part(s) of a data thread being executed by an assigned core.

FIGS. 6A and 6B are tables listing experimental results of load balancing methods for storage systems consistent with embodiments of the inventive concept. FIG. 6A shows core utilization and I/O throughput when client requests are stored in a work queue by a scheduler, and I/O requests assigned to one or more control threads executed by multiple cores from the work queue. It is assumed that the corresponding processor sub-system includes five (5) cores. FIG. 6B illustrates core utilization and I/O throughput when a client connection is assigned to a data thread executed in one core in a processor sub-system including four cores. It is further assumed that I/O requests by the connection are immediately processed by the data thread, and thus, overhead caused by queuing the I/O requests and/or overhead caused by context switching between threads are reduced.

Referring to FIGS. 1, 6A and 6B, when the storage system 10 communicates with one client (that is, when the storage system 10 has one connection), FIG. 6A show a utilization rate of 76% for two cores, while FIG. 6B shows a utilization rate of 100% for one core. With respect to the corresponding I/O throughput, FIG. 6B shows a performance improvement of about 14K IOPS as compared with FIG. 6A. Similarly, when the storage system 10 communicates with two, three or four clients (that is, when the storage system 10 has two, three or four connections), FIG. 6B shows improved core utilization and I/O throughput as compared with FIG. 6A.

Figure 7:
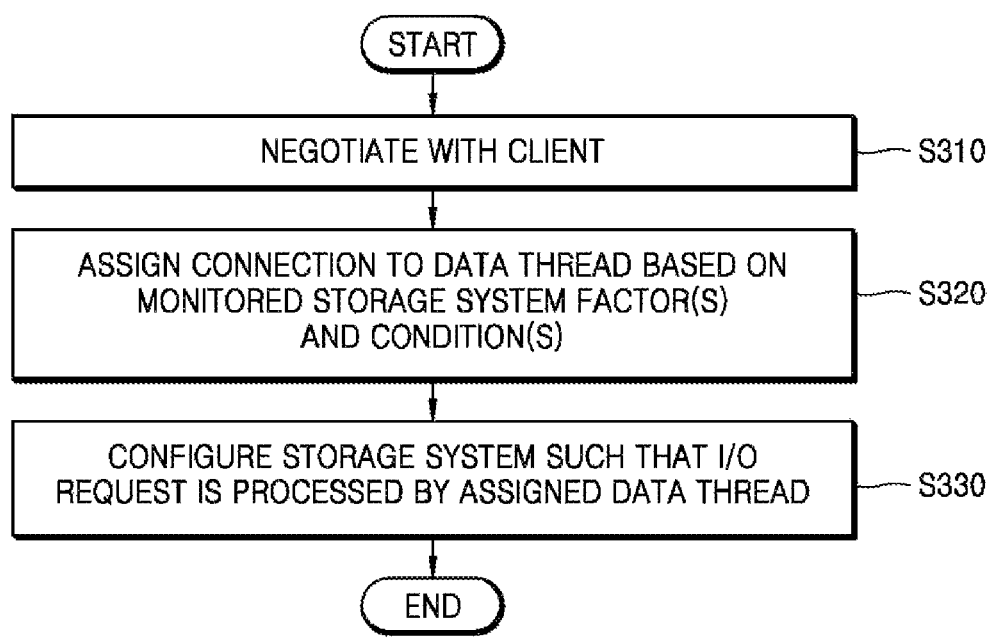
FIG. 7 is a flowchart of an example of an operation of allocating or assigning a connection with a client to a data thread via a control thread of FIG. 2, according to an exemplary embodiment.

FIG. 7 is another flowchart further illustrating in one example the step of assigning a client connection to a data thread (S300) described in FIG. 2 according to embodiments of the inventive concept. As described above with reference to FIG. 2, an initially designated control thread (or the single control thread of FIG. 3) may be used to assign a new client connection to a data thread being executed by one of the plurality of cores 110 to 140 (S300). This connection assignment step (S300) may include the sub-step of negotiating with the client (S310). Here, it should be noted that a would-be client may indicate one or more I/O requirement(s) using the client log-in request (S200) establishing a client connection with the storage system 10. Alternately or additionally, a new client may communicate I/O requirement(s) to the storage system 10 following establishment of a client connection. The initially designated control thread used to assign the new client connection may be used to negotiate with the new client (e.g., accept or reject I/O requirement(s) indicated by the client based on monitored current I/O throughput and/or data thread latency, etc.). The client negotiation sub-step (S310) may be iteratively performed between the would-be/new client and the storage system 10.

Once the new client has been accepted, along with its negotiated I/O requirements, the corresponding client connection is assigned to a data thread (S320). This assignment determination may be made in response to one or more conditions including, for example, the negotiated I/O requirement(s), current I/O throughput, data thread latencies, I/O throughput limit(s), etc. Here, certain I/O requirement(s) of the client may be set by an administrator of the storage system 10. I/O throughput limit(s) may vary with assigned thread, corresponding sub-thread(s) and/or core, available storage system power, available computational capabilities and/or memory resources, network adapter speed, data network state, etc. Different threads, sub-threads and/or cores may have different I/O throughput limit(s) and may vary with changes in any of the foregoing factors and/or conditions. This feature will be described in some additional detail hereafter with reference to FIG. 8.

Once the new client connection has been negotiated (S310) and assigned (S320), the storage system 10 may be configured such that subsequently received I/O requests from the client will be scheduled and processed by the assigned data thread (S330). That is, the storage system 10 may be configured (e.g.,) by the initially designated control thread to establish the connection between the client and its assigned data thread. In this manner, sub-step (S330) may be part and parcel of step S400 of FIG. 2. This feature will be variously described in some additional detail with reference to FIGS. 9 and 10.

Figure 8:
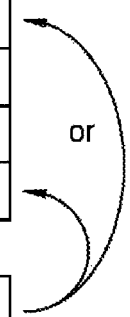
FIG. 8 is a flowchart of an example of an operation of determining a data thread, to which a connection is allocated or assigned of FIG. 7, according to an exemplary embodiment.

FIG. 8 is a table listing the various features and conditions described above in relation to sub-step (S320) of FIG. 7 according to an exemplary embodiment. With reference to FIGS. 1, 3, 7 and 8, the table of FIG. 8 shows assumed I/O throughput limits of the four (4) data threads DT_1 to DT_4 of FIGS. 3 and 4, as well as assumed, current I/O throughputs for each one of the ten (10) connections C01 to C10 variously assigned to the four threads DT_1 to DT_4.

As further illustrated in FIG. 8, in order to assigned yet another (an eleventh C11) connection to one of the four data threads, current I/O throughput for each of the four data threads, relevant I/O throughput limit(s), as well as I/O requirement(s) indicated by the eleventh client C11 must be considered (e.g.,) by an initially designated control thread. Assuming that the I/O requirement of the eleventh client C11 (which may be defined through the sub-step of client negotiation S310 of FIG. 7) is at least 20K IOPS, a connection associated with the eleventh client C11 may be assigned to either the third data thread DT_3 or the fourth data thread DT_4 by the initially designated control thread. That is, if the eleventh connection C11 were assigned to the first data thread DT_1 or the second data thread DT_2, the resulting I/O throughput would exceed existing I/O throughput limit(s). Accordingly, the first data thread DT_1 and the second data thread DT_2 are excluded from consideration during the assignment step. Thus, as illustrated in FIG. 8, when the net effect on total I/O throughput, as a result of (e.g.,) a marginal 20K IOPS, on the third data thread DT_3 and fourth data thread DT_4 is the same, the eleventh connection C11 may be assigned based on some other defined criteria (e.g., priority order among the data threads, the number of connections already assigned to a data thread, the volume of I/O throughput limit(s) etc.).

Figure 9:
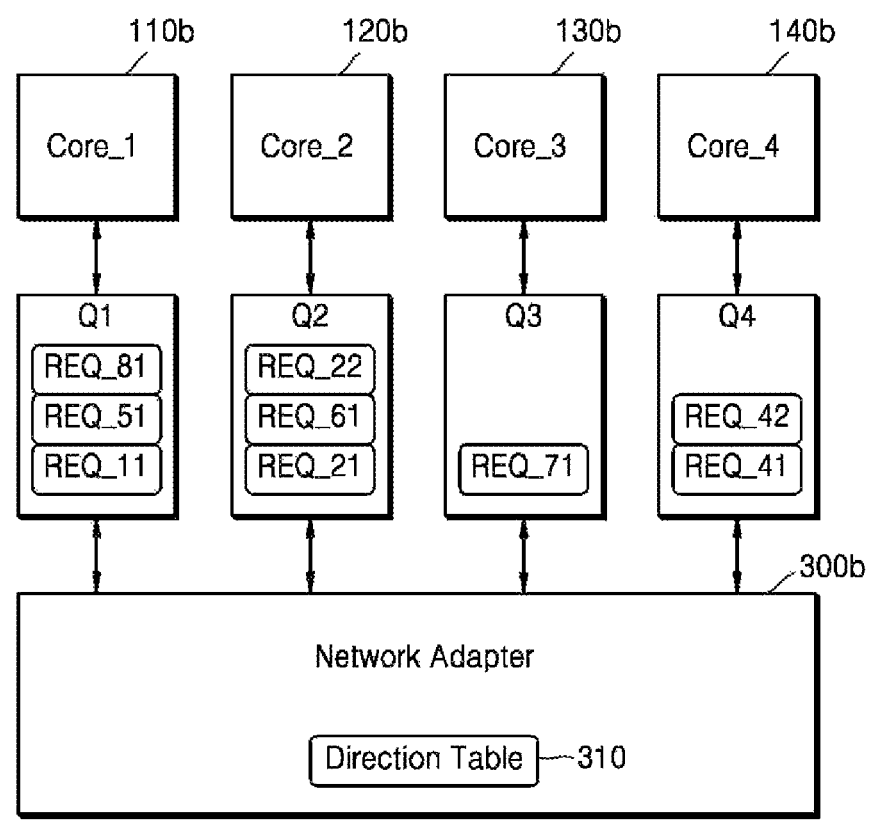
FIG. 9 is a diagram of an operation of a network adapter, according to an exemplary embodiment.
Figure 10:
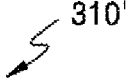
FIG. 10 is a view of an example of a direction table of FIG. 9, according to an exemplary embodiment.

FIG. 9 is a block diagram further illustrating in one example the operation of a network adapter 300b according to an exemplary embodiment. FIG. 10 is a table further illustrating in one example 310' the direction table 310 of FIG. 9. As described above with reference to FIG. 7, the sub-step of configuring the storage system 10 such that an I/O request from a client is correctly processed by an assigned data thread may be performed. According to an exemplary embodiment, an initially designated control thread may perform the operation of configuring the storage system 10 by properly setting the network adapter 300*b*. Here again, like the exemplary embodiments described in relation to FIGS. 3 and 4, it is assumed in FIGS. 9 and 10 that ten (10) connections C01 to C10 have been assigned to four (4) cores 110*b* to 140*b* and four (4) corresponding data threads DT_1 to DT_4.

Referring to FIG. 9, the storage system 10 is further assumed to include work queues Q1 to Q4 which may be respectively accessed by the cores 110*b* to 140*b*. Work queues Q1 to Q4 may be realized, for example, in the shared memory 410, or in a memory included in the network adapter 300*b*. Each of the cores 110*b* to 140*b* may access the corresponding work queue in order to process I/O request(s) received from client(s). Thus, the first core 110*b* may access the first work queue Q1 to process a request REQ_11 corresponding to the first connection C01, a request REQ_51 corresponding to the fifth connection C05, and a request REQ_81 corresponding to the eighth connection C08. That is, when I/O requests assigned to a data thread executed by a corresponding core are added in a corresponding work queue, the data thread may execute the received I/O requests in a controlled manner In other words, connections may be assigned to a particular data thread by consistently queuing corresponding I/O requests is an associated work queue.

The network adapter 300*b* may include the direction table 310 and may add the I/O requests received via the data network 20 in a specific work queue, by referring to the direction table 310. Referring to FIG. 10, when the ten connections C01 to C10 are assigned to the four cores 110*b* to 140*b* as illustrated in FIG. 3, the direction table 310' may be configured as shown in FIG. 10. That is, the direction table 310' may include information about the work queue accessed by the core in which the connection and the data thread, to which the connection is assigned, are executed. For example, based on the direction table 310', the requests of the first connection C01 assigned to the first data thread DT_1 executed by the first core 110*b* may be added in the first work queue Q1.

According to an exemplary embodiment, the direction table 310 of FIG. 9 may be programmed using the initially designated control thread or another control thread running on the processor subsystem 100. That is, a control thread may be used to program the direction table 310 to realize the proper configuration of the storage system 10, such that the I/O requests of the client are processed by the assigned data thread.

According to an exemplary embodiment, the control thread may assign a communication handle corresponding to a client connection to the data thread to realize the operation of configuring the storage system 10 such that I/O requests are processed by the assigned data thread. That is, the control thread may assign the communication handle corresponding to the client connection to the data thread to realize the operation assignment of the connection to the data thread. The communication handle may be, but is not limited to, a socket handle, where a socket (or network) handle is an endpoint of inter-process communication, and may include information regarding a start point and an end point of data migration.

Figure 11:
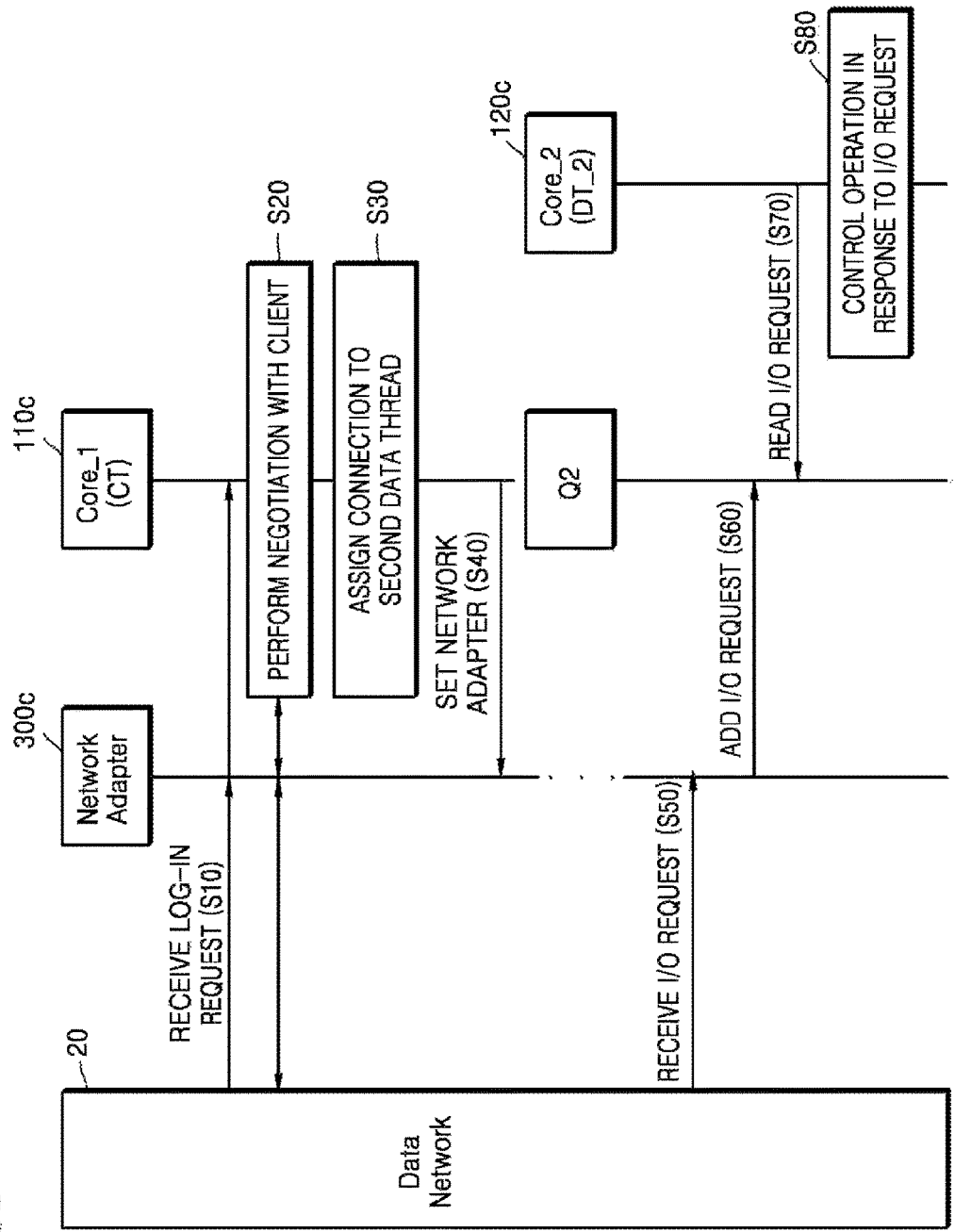
FIG. 11 is a view for describing an operation among components of a storage system, over time, according to an exemplary embodiment.

FIG. 11 is an operational timing diagram illustrating various interoperations among the components of the storage system 10 according to an exemplary embodiment. The diagram of FIG. 11 further illustrates the operation of assigning a connection to the data thread within the storage system 10 of FIG. 1. Here, it is assumed that a control thread CT is running on (or being executed by) a first core 110*c*. It is further assumed that an incoming client request for connection will be assigned to a the second data thread DT_2 executed by a second core 120*c*.

Accordingly, a network adapter 300*c* receives a log-in request from the client via the data network 20 and passes (or communicates) the log-in request to the first core 110*c* running the control thread CT (S10). Next, the control thread CT may exchange information with the client via a combination of the network adapter 300*c* and data network 20 to negotiation connection conditions with the client (S20). As a result of the negotiation with the client, certain I/O requirements associated with or indicted by the client may be determined.

Once negotiation of the client connection conditions is complete, the control thread CT may determine that the new client connection should be assigned to a particular data thread, i.e., the second data thread DT_2 (S30). As described above, the control thread CT may make this assignment determination based on a number of factors and storage system conditions, including I/O requirements of the client, current I/O throughput(s), data thread latencies, I/O throughput limit(s), etc.

Once the client connection has been assigned by the control thread CT to a data threads, the control thread may further be used to set-up the network adapter 300*c* to provide the operational configuration necessary to the foregoing assignment (S40). For example, as described above with reference to FIGS. 9 and 10, the control thread CT may add the client connection and the second work queue Q2 information in the direction table included in the network adapter 300*c*.

Once appropriately set-up, the network adapter 300*c* may pass an I/O request received from the client via the established connection to the assigned data thread (S50). In the illustrated example of FIG. 11, this is accomplished by passing a received I/O request from the network adapter 300*c* to the second work queue Q2 based on the direction table (S60), and then reading the queued I/O request from the second work queue Q2 using the second data thread DT_2 (S70). In this manner, the second data thread DT_2 may obtain the I/O request and control the execution of one or more operation(s) responsive to the I/O request.

Figure 12:
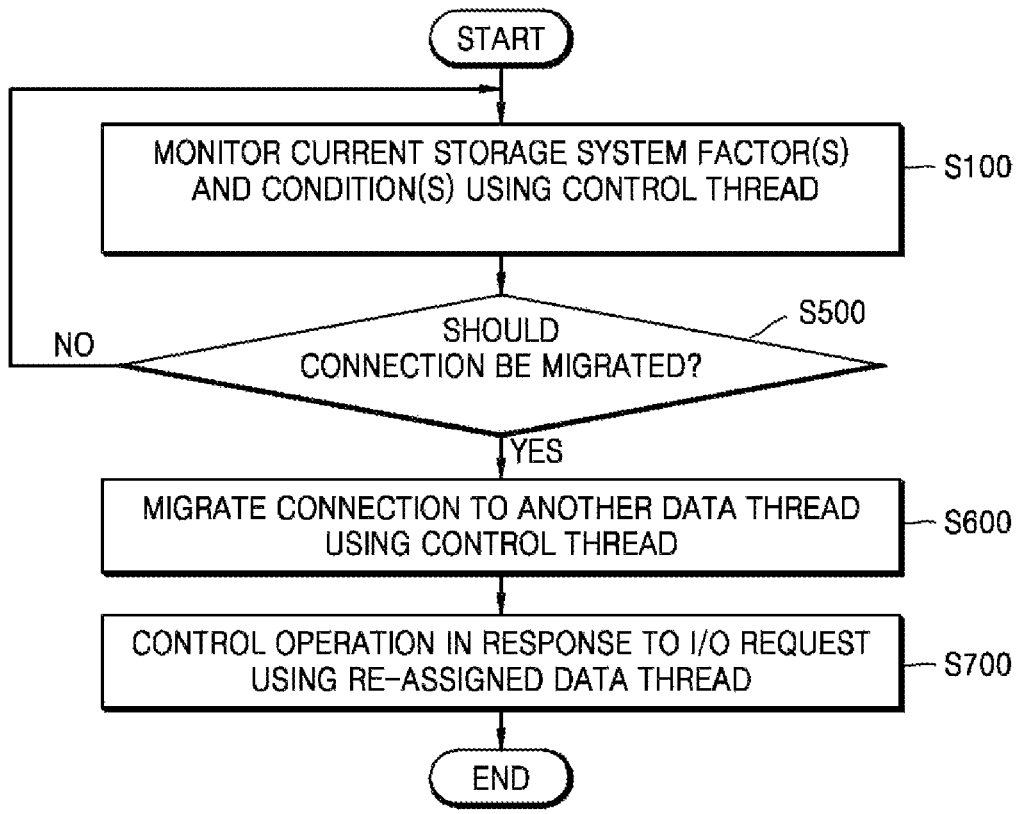
FIG. 12 is a flowchart of a load balancing method in the storage system of FIG. 1, according to an exemplary embodiment.

FIG. 12 is another flowchart illustrating a load balancing method for the storage system 10 of FIG. 1 according to an exemplary embodiment. The method summarized in the flowchart of FIG. 12 migrates a connection previously assigned to one data thread to another data thread. The load balancing method of FIG. 12 will be described in the context of the storage system 10 of FIG. 1 including the processor sub-system 100 (e.g., cores 110 to 140) capable of executing a plurality of data threads.

Like the methods previously described in relation to FIG. 1 (S100), the method of FIG. 12 monitors current I/O throughputs, data thread latencies and/or other storage system factors and conditions using (e.g.,) a control thread (S100').

Based on one or more of these monitored factors and conditions, a determination is made as to whether a connection should be migrated from its current data thread assignment to a different data thread assignment (S500). For example, the one or more monitored storage system factors and conditions may indicate that an improved core utilization rate may be achieved by migrating a particular connection between data threads. Various I/O throughput(s) or data thread latencies may be improved by migrating a particular connection between data threads. One or more of these connection migration determinations may be made using a control thread. Of course, a threshold determination to migrate a connection must be tested against storage system constraints, such as I/O throughput limits, etc. One example of the step of migrating a connection among data threads is presented in some additional detail with reference to FIG. 13.

When a determination is made to migrate a connection, the process of migrating the connection may be performed by a control thread (S600) running on a core of the processor subsystem 100. That is, the storage system 10 may use a control thread to essentially reassign a client connection such that subsequent I/O requests received from the connection are processed using the data thread to which the connection has been reassigned. For example, as described above with reference to FIGS. 9 and 10, a control thread may realize migration of a connection by (re-)programming the direction table of the network adapter 300.

After a connection has been migrated (reassigned) from a previously assigned data thread to a reassigned data thread, the reassigned data thread may be used to control the execution of operations indicted by or responsive to I/O requests received from the client (S700).

FIG. 13 is a table listing a few, exemplary storage system factors and conditions that may influence the execution of the method described above in relation to FIG. 12. FIG. 13 includes a BEFORE Table showing storage system conditions before a connection migration and an AFTER Table showing storage system conditions after the connection migration.

When I/O throughput for a particular connection greatly increases or an I/O throughput limit associated with a particular connection dynamically decreases, a cumulative I/O throughput for a data thread may exceed its I/O throughput limit(s). As an example, it is assumed in FIG. 13 that the I/O throughput of the ninth connection C09 increases to 60K IOPS from a previous 40K IOPS. (See, FIG. 8). Hence, a cumulative I/O throughput of 180K IOPS is suddenly demanded for the first data thread DT_1, but this cumulative demand exceeds the established I/O throughput limit of 160K IOPS. Accordingly, a monitoring control thread may initiate a connection migration routine like the method of FIG. 12. That is, a determination that a data thread I/O throughput limit has been (or will be) exceeded may constitute one type of event triggering one or more connection migrations among available data threads.

Assuming this type of event, a data thread may forcibly limit by itself the I/O throughput available to one or more previously assigned connection(s), such that the I/O throughput for the data thread is not exceeded. Thus, in the example of FIG. 13, the first data thread DT_1 may limit the I/O throughput for one or more of the assigned connections C01, C05, C08, and C09 such that a resulting cumulative I/O throughput does not exceed 160K IOPS.

In response to the connection migration triggering event, a control thread may determine whether it is possible to reassign at least one connection (e.g., the ninth connection C09) from the data thread manifesting the triggering event (e.g., the first data thread DT_1) to a different data thread (e.g., the fourth data thread DT_4). In the working example, the overloaded first data thread DT_1 must shed at least 20K IOPS of throughput to remain within established I/O throughput limits. However, none of the second data thread DT_2, third data thread DT_3 and fourth data thread DT_4 is currently able to absorb the additional throughput required to receive (via connection migration) a connection from the first data thread DT_1 without exceeding its own I/O throughput limit.

Accordingly, where a straight connection migration (i.e., a migration of a connection from one data thread to another data thread) will not work to alleviate excess throughput demand on a particular data thread, a swapped connection migration may be considered.

Thus, it will be appreciated at this point by those skilled in the art that a "connection migration" need not be limited to the simple moving of a connection from one data thread to another data thread. Rather, connection migration may involve a more complicated connection load rebalancing across two or more data threads.

As illustrated by a comparison of the BEFORE and AFTER tables of FIG. 13, the ninth connection C09 previously assigned to the first data thread DT_1 may be swapped with the tenth connection C10 previously assigned to the third data thread DT_3. Thus, the connection migration contemplated by the example of FIG. 13 involves reassigning the ninth connection C09 to the third data thread DT_3 and also reassigning the tenth connection C10 to the first data thread DT_1 to swap these two connections between data threads. Following the swap connection migration of the ninth and tenth connections C09 and C10 the respective I/O throughputs limits for the first and third data threads DT_1 and DT_3 are not exceeded.

Figure 14:
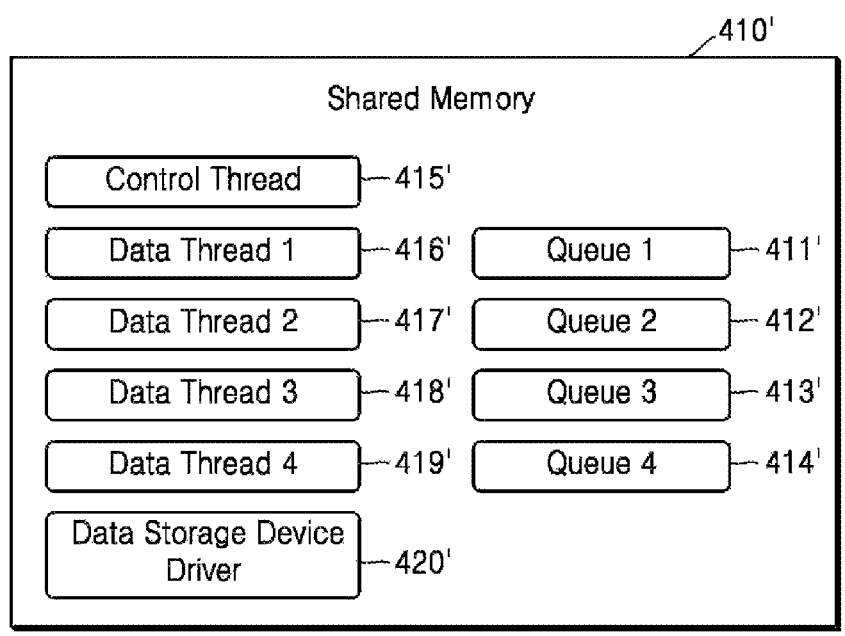
FIG. 14 is a diagram of an example of a shared memory, according to an exemplary embodiment.

FIG. 14 is a block diagram illustrating in one example 410' the shared memory 410 of FIG. 1. As described above with reference to FIG. 1, the memory sub-system 400 may include the shared memory 410, and the shared memory 410 may store data shared by the other components 100, 200, and 300 of the storage system 10, instructions executed by the cores 110 to 140, and data shared by the cores 110 to 140. Referring to FIG. 14, the shared memory 410' may include a plurality of queues 411' to 414', a control thread 415', first to fourth data threads 416' to 419', and a data storage device driver 420'.

The plurality of queues 411' to 414' may be accessed by the cores 110 to 140, respectively, and data read from the data storage device 200 or data to write to the data storage device 200 may be stored via data threads executed in the cores 110 to 140. Also, according to an exemplary embodiment, the plurality of queues 411' to 414' may include the work queues Q1 to Q4 of FIG. 9, respectively.

The control thread 415' may include instructions for operations performed by the control thread. Any one of the cores 110 to 140 may access a control thread 415' of the shared memory 410', and may execute instructions included in the control thread 415'.

Each of the first to fourth data threads 416' to 419' may include instructions for the operations performed by the data thread. The cores 110 to 140 may access the first to fourth data threads 416' to 419' of the shared memory 410', respectively, and execute instructions included in each of the first to fourth data threads 416' to 419'.

The data storage device driver 420' may include instructions for operations accessing the data storage device 200. For example, the first to fourth data threads 416' to 419' may use functionality provided by the data storage device driver 420' to control the access operations directed to the data storage device 200.

While the inventive concept has been particularly shown and described with reference to embodiments thereof, it will be understood that various changes in form and details may be made therein without departing from the scope of the following claims.

What is claimed is:

1. A load balancing method executed by a storage system comprising: a plurality of cores including a first core executing a first data thread and a second core executing a second data thread, and a network adapter connecting a data network to the plurality of cores, the method comprising:
   receiving a log-in request from a client via the data network and the network adapter;
   assigning, using a control thread executed by one of the plurality of cores, a first connection between the client and the first data thread in response to the log-in request; and
   executing, with the first core, all operations associated with requests received from the client via the first connection.

2. The load balancing method of claim 1, further comprising:
   monitoring at least one of input/output (I/O) throughputs for the first and second cores, latencies for the first and second data threads, and I/O throughput limits for the first and second data threads,
   wherein the assigning of the first connection between the client and the first data thread is based on the at least one of the I/O throughputs for the first and second cores, the latencies for the first and second data threads, the I/O throughput limits for the first and second data threads, and an I/O throughput requirement for the client.

3. The load balancing method of claim 2, wherein the control thread is executed by one of the first core and the second core.

4. The load balancing method of claim 2, wherein:
   the first data thread comprises a first sub-thread executed by the first core and a second sub-thread executed by the first core, and
   the first sub-thread receives all input requests among the requests received from the client via the first connection and the second sub-thread receives all output requests among the requests received from the client via the first connection.

5. The load balancing method of claim 2, further comprising:
   negotiating, by the control thread and upon receiving the log-in request from the client, with the client to determine the I/O throughput requirement for the client, wherein
   the assigning of the first connection between the client and the first data thread is performed only after determining the I/O throughput requirement for the client.

6. The load balancing method of claim 5, wherein the negotiating by the control thread with the client includes an iterative exchange of information defining the I/O throughput requirement for the client.

7. The load balancing method of claim 2, wherein the monitoring of the at least one of the I/O throughputs for the first and second cores, the latencies for the first and second data threads, and the I/O throughput limits for the first and second data threads is performed periodically according to a schedule or in response to a monitoring event.

8. A load balancing method executed by a storage system, the storage system comprising: a processor subsystem including a first core executing a first data thread and a second core executing a second data thread, and a network adapter connecting a data network to the processor subsystem and including a first work queue and a second work queue, the method comprising:
   receiving a first log-in request from a first client, a second log-in request from a second client, and a third log-in request from a third client via the data network and the network adapter;
   assigning, using a control thread executed by the processor subsystem, a first connection between the first client and the first data thread in response to the first log-in request, a second connection between the second client and the second data thread in response to the second log-in request, and a third connection between the third client and the first data thread in response to the third log-in request;
   executing all operations associated with first requests received from the first client via the first connection with the first core; and
   executing all operations associated with second requests received from the third client via the third connection with the first core, wherein
   the assigning of the first connection and the assigning of the third connection by the control thread respectively comprise configuring the network adapter such that the first requests received from the first client and the second requests received from third client are stored in the first work queue, and the first work queue is read by the first data thread.

9. The load balancing method of claim 8, wherein:
   the first data thread schedules execution of the first requests and the second requests stored in the first work queue according to a weighted scheduling scheme, and
   at least one of the first requests has a priority different from at least one of the second requests.

10. The load balancing method of claim 8, wherein the configuring of the network adapter comprises referencing a direction table stored in the network adapter and updating, by the control thread, the direction table upon respectively assigning the first connection, second connection and third connection.

11. The load balancing method of claim 8, further comprising:
   monitoring at least one of input/output (I/O) throughputs for the first and second cores, latencies for the first and second data threads, and I/O throughput limits for the first and second data threads, wherein
   the assigning of the first connection, the second connection and the third connection is based on the at least one of the I/O throughputs for the first and second cores, the latencies for the first and second data threads, the I/O throughput limits for the first and second data threads, and a first I/O throughput requirement for the first client, a second I/O throughput requirement for the second client, and a third I/O throughput requirement for the third client.

12. The load balancing method of claim 11, further comprising:
   negotiating, by the control thread and upon receiving the first log-in request, with the first client to determine the first I/O throughput requirement,
   negotiating, by the control thread and upon receiving the second log-in request, with the second client to determine the second I/O throughput requirement, and
   negotiating, by the control thread and upon receiving the third log-in request, with the third client to determine the third I/O throughput requirement.

13. The load balancing method of claim 8, further comprising migrating, using the control thread, the third connection from the first data thread to the second data thread by reassigning the third connection to the second data thread.

14. The load balancing method of claim 8, further comprising swapping, using the control thread, the third connection and second connection by reassigning the third connection from the first data thread to the second data thread and reassigning the second connection from the second data thread to the first data thread.

15. A storage system connected via a data network to a client, the storage system comprising:

a processor subsystem including a first core executing a first data thread and a second core executing a second data thread, wherein either the first core or the second core executes a control thread; and a network adapter that connects the data network to the processor subsystem, wherein:

in response to receiving a log-in request from a client via the data network, the control thread configures the network adapter to assign a connection between the client and the first data thread, and the first core executes all operations associated with requests received from the client via the connection.

16. The storage system of claim 15, wherein the control thread configures the network adapter based on input/output (I/O) throughputs for the first and second cores, latencies for the first and second data threads, and I/O throughput limits for the first and second data threads.

17. The storage system of claim 16, wherein:

the control thread negotiates with the client to determine an I/O throughput requirement for the client, and the control thread further configures the network adapter based on the I/O throughput requirement for the client.

18. The storage system of claim 16, wherein the at least one of the I/O throughputs for the first and second cores, the latencies for the first and second data threads, and I/O throughput limits for the first and second data threads is monitored periodically according to a schedule or in response to a monitoring event.

19. The storage system of claim 16, further comprising:

a data storage device, wherein at least one of the requests is directed to data stored in the data storage device.

* * * * *